United States Patent
Yan (10) Patent No.: US 12,531,316 B2
(45) Date of Patent: Jan. 20, 2026

(54) BATTERY CELL HOUSING, BATTERY CELL, BATTERY, AND ELECTRIC DEVICE

(71) Applicant: NINGDE AMPEREX TECHNOLOGY LIMITED, Ningde (CN)

(72) Inventor: Kun Yan, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 565 days.

(21) Appl. No.: 17/985,635

(22) Filed: Nov. 11, 2022

(65) Prior Publication Data

US 2023/0155259 A1    May 18, 2023

(30) Foreign Application Priority Data

Nov. 13, 2021  (CN) .......................... 202111343660.6

(51) Int. Cl.
*H01M 50/545* (2021.01)
*H01M 50/202* (2021.01)
(Continued)

(52) U.S. Cl.
CPC ....... *H01M 50/545* (2021.01); *H01M 50/202* (2021.01); *H01M 50/222* (2021.01);
(Continued)

(58) Field of Classification Search
CPC ............. H01M 50/545; H01M 50/202; H01M 50/222; H01M 50/224; H01M 50/227;
(Continued)

(56) References Cited

U.S. PATENT DOCUMENTS

| 10,658,632 B1 | 5/2020 | Zeng et al. |
| 2011/0027647 A1 | 2/2011 | Nakai et al. |
| 2019/0173134 A1 | 6/2019 | Lee et al. |

FOREIGN PATENT DOCUMENTS

| CN | 205790105 U | 12/2016 |
| CN | 110246994 A | 9/2019 |

(Continued)

OTHER PUBLICATIONS

Extended European Search Report for EP Application No. 22206591.4, dated Apr. 11, 2023.
(Continued)

*Primary Examiner* — Adam A Arciero
(74) *Attorney, Agent, or Firm* — XSENSUS LLP (57) ABSTRACT

Disclosed herein are a battery cell housing, a battery cell, a battery, and an electric device. The battery cell housing defines a cavity configured to accommodate an electrode assembly, and the battery cell housing includes a first housing and a second housing. The first housing is electrically connected to a first tab of the electrode assembly. The second housing is fixed to the first housing in an insulated manner. The second housing is electrically connected to a second tab of the electrode assembly and the second tab is different from the first tab in polarity. The first housing includes a bulge electrically connected to the first tab, and the bulge extends in a direction approaching the second housing. Therefore, there is no need to provide a hole in the battery cell housing, thereby rendering the battery cell housing more integral.

19 Claims, 6 Drawing Sheets

(51) Int. Cl.
*H01M 50/222* (2021.01)
*H01M 50/224* (2021.01)
*H01M 50/227* (2021.01)
*H01M 50/30* (2021.01)
*H01M 50/627* (2021.01)

(52) U.S. Cl.
CPC ....... *H01M 50/224* (2021.01); *H01M 50/227* (2021.01); *H01M 50/30* (2021.01); *H01M 50/627* (2021.01)

(58) Field of Classification Search
CPC .... H01M 50/30; H01M 50/627; H01M 10/04; H01M 50/102; H01M 50/116; H01M 50/233; H01M 50/553; H01M 50/531; H01M 50/103
See application file for complete search history.

(56) References Cited

FOREIGN PATENT DOCUMENTS

| | | |
|---|---|---|
| CN | 111403670 A | 7/2020 |
| CN | 212571194 U | 2/2021 |
| CN | 212648339 U | 3/2021 |
| CN | 212725400 U | 3/2021 |
| CN | 112510326 A | 6/2021 |
| CN | 113258207 A | 8/2021 |
| KR | 20220003302 U | 9/2022 |
| TW | M615887 U | 8/2021 |

OTHER PUBLICATIONS

First Office Action of CN application No. 202111343660.6, dated Dec. 29, 2023.

BATTERY CELL HOUSING, BATTERY CELL, BATTERY, AND ELECTRIC DEVICE

CROSS-REFERENCE TO THE RELATED APPLICATIONS

This application claims the benefit of priority from the Chinese Patent Application No. 202111343660.6, filed on Nov. 13, 2021, which is hereby incorporated by reference in its entirety.

TECHNICAL FIELD

Embodiments of the present application relate to the technical field of electronic devices, and in particular, to a battery cell housing, a battery cell, a battery, and an electric device.

BACKGROUND

In a related art, in order to output a current from an internal electrode assembly, a hole needs to be provided in an outer housing of the battery cell, which renders the battery cell housing less integral.

SUMMARY

Embodiments of the present application provide a battery cell housing, a battery cell, a battery, and an electric device, which can render the battery cell housing more integral.

To solve the foregoing technical problem, a technical solution used in the present application is as follows: A battery cell housing is provided, the battery cell housing defines an accommodating cavity configured to accommodate an electrode assembly, and the battery cell housing includes a first housing and a second housing. The first housing is configured to be electrically connected to a first tab of the electrode assembly. The second housing is fixed to the first housing in an insulated manner to define the accommodating cavity, the second housing is configured to be electrically connected to a second tab of the electrode assembly, and the second tab is different from the first tab in polarity. The first housing includes a bulge configured to be electrically connected to the first tab, at least part of the bulge is exposed outside the accommodating cavity, and the bulge is configured to extend in a direction approaching the second housing. In this solution, the first housing is electrically connected to the first tab and the second housing is electrically connected to the second tab. Therefore, to meet a need of an electric connection to an external circuit, there is no need to provide a hole in the battery cell housing, and a current in the electrode assembly can be directly output to the external circuit through the first housing and the second housing, thereby rendering the battery cell housing more integral. Further, in the present application, the first housing includes a bulge, the bulge is configured to be electrically connected to an external circuit, and the bulge is configured to extend in a direction approaching the second housing, so that there is a proper distance between the bulge and the second housing, thereby facilitating an electrical connection between the battery cell and the external circuit.

In a further embodiment, the bulge is outside the accommodating cavity. In this solution, the bulge is positioned more flexibly, so that it is more convenient to adjust relative positions of the bulge and the second housing.

In a further embodiment, the battery cell housing farther includes a first insulation portion, and the first insulation portion is connected to the first housing and the second housing; and the first housing, the second housing and the first insulation portion jointly define the accommodating cavity. In this solution, when the first insulation portion is connected to the first housing and the second housing to implement insulated fixation of the first housing and the second housing, it is more convenient to connect and fix the first housing to the second housing. In addition, the insulation portion is also configured to define the accommodating cavity, which can improve an insulation effect on the first housing and the second housing.

In a further embodiment, the first housing includes an annular frame body electrically connected to the first tab, and the frame body includes a first port. The first insulation portion is annular and is connected to an outer peripheral edge, at the first port, of the frame body. The second housing further includes a first plate body; the first plate body is connected to a side, farther away from the frame body, of the first insulation portion and covers the first port; and the bulge is connected to the first plate body. In this solution, the first housing has the annular frame body, and one side of the first housing is connected to a plate-shaped bulge, so that the bulge can extend to be close to the frame body in a circumferential direction, and the bulge is positioned more flexibly.

In a further embodiment, the bulge is outside the accommodating cavity and is connected to an edge of the first plate body. In this solution, the bulge is connected to an edge of the first plate body, so that the bulge can be closer to the second housing, thereby facilitating extension of the bulge toward the second housing.

In a further embodiment, the bulge is configured to extend in a direction approaching the frame body. In this solution, the frame body is closer to the bulge, and when the bulge extends toward the frame body, an extension distance of the bulge can be reduced and a volume of the bulge can be decreased.

In a further embodiment, the bulge is spaced apart from an outer wall face of the frame body. In this solution, the bulge is spaced apart from the frame body, to implement insulation between the bulge and the frame body through a simple structure at a low cost.

In a further embodiment, a second insulation portion is provided between the bulge and the frame body, a side face of the second insulation portion is connected to the outer wall face of the frame body, and another side face of the second insulation portion is connected to the bulge. In this solution, the bulge is fixed to the frame body through the second insulation portion, so that the bulge is arranged in a more stable structure.

In a further embodiment, the first insulation portion sequentially includes a first material layer, a second material layer and a third material layer in a direction from the first plate body to the frame body; the second material layer is made of an insulation material; the first material layer and the first plate body each are made of a metal material; and the third material layer and the frame body each are made of a metal material. In this solution, the connection between the first material layer and the first plate body is more stable, and the connection between the third material layer and the frame body is more stable. That is, the insulated connection between the first housing and the second housing is more stable.

In a further embodiment, a connecting flange is provided at the outer peripheral edge, at the first port, of the frame body; the connecting flange extends into the accommodating cavity; and the first insulation portion is connected to a wall face, facing the first plate body, of the connecting flange. In this solution, the frame body and the first insulation portion are connected more stably due to a larger contact area therebetween.

In a further embodiment, the second housing further includes a second plate body, the frame body includes a second port opposite the first port, and the second plate body is connected to the frame body and covers the second port. In this solution, there is no need to provide redundant insulation portions to connect the second plate body to the frame body, and therefore, the structure is simpler.

In a further embodiment, a maximum thickness of the frame body is greater than that of the first plate body and the second plate body, and the maximum thickness L1 of the frame body, the maximum thickness L2 of the first plate body and the maximum thickness L3 of the second plate body satisfy that 0.01 mm≤L1−L2≤0.5 mm, and 0.01 mm≤L1−L3≤0.5 mm. In this solution, with a greater maximum thickness of the frame body, structural strength of the battery cell housing can be ensured, and with smaller maximum thicknesses of the first plate body and the second plate body, the battery cell housing may occupy a smaller space and the electrode assembly in the battery cell housing may have a larger volume, thereby increasing the energy density of the battery cell with the battery cell housing in the present application. That is, in the foregoing solution, the structural strength of the battery cell housing can be ensured, and the energy density of the battery cell with the battery cell housing can also be improved.

In a further embodiment, the maximum thickness L1 of the frame body satisfies that 0.1 mm≤L1≤1 mm; the maximum thickness L2 of the first plate body satisfies that 0.03 mm≤L2≤0.6 mm; and the maximum thickness L3 of the second plate body satisfies that 0.03 mm≤L3≤0.6 mm. In this solution, with the maximum thickness L1 within the foregoing size range, the frame body may have proper structural strength without occupying an excessively large space of the electrode assembly. With the maximum thickness L2 within the foregoing size range, the first plate may occupy a smaller space while ensuring a basic protection effect. With the maximum thickness L3 within the foregoing size range, the second plate body may occupy a smaller space while ensuring a basic protection effect.

In a further embodiment, the frame body is made of a carbon material, a metal material or a polymer material; the first plate body is made of a carbon material, a metal material or a polymer material; and the second plate body is made of a carbon material, a metal material or a polymer material. In this solution, the frame body, the first plate body and the second plate body can facilitate wiring and connection, and can also have sufficient structural strength.

In a further embodiment, the frame body is provided with a liquid injection hole. In this solution, the liquid injection hole is provided in a relatively thicker frame body, which can facilitate opening and sealing of the liquid injection hole.

In a further embodiment, the first plate body or the second plate body is provided with an explosion-proof valve. In this solution, the explosion-proof valve is arranged on the relatively thinner first plate body or second plate body, which can reduce processing difficulty of the explosion-proof valve and also improve protection performance of the explosion-proof valve.

A second aspect of the present application further provides a battery cell, including the battery cell housing and the electrode assembly in any one of the foregoing embodiments, the electrode assembly is provided in the accommodating cavity, the electrode assembly includes the first tab and the second tab, the first tab is electrically connected to a first housing, and the second tab is electrically connected to a second housing.

A third aspect of the present application further provides a battery, including the battery cell in the foregoing embodiments.

A fourth aspect of the present application further provides an electric device, including the battery in the foregoing embodiments.

In the battery cell housing provided in the present application, the first housing is electrically connected to the first tab and the second housing is electrically connected to the second tab. Therefore, there is no need to provide a hole in the battery cell housing, and a current in the battery cell housing can be directly output to the external circuit through the first housing and the second housing, thereby rendering the battery cell housing more integral. Further, in the present application, the first housing includes a bulge, the bulge is configured to be electrically connected to an external circuit, and the bulge is configured to extend in a direction approaching the second housing, so that there is a proper distance between the bulge and the second housing, thereby facilitating an electrical connection between the battery cell and the external circuit.

BRIEF DESCRIPTION OF DRAWINGS

To describe the technical solutions in some embodiments of this application more clearly, the following briefly describes the accompanying drawings required for describing some embodiments of this application. Apparently the accompanying drawings in the following description show merely some embodiments of this application, and a person of ordinary shill in the art may still derive other drawings from the accompanying drawings without creative efforts.

DETAILED DESCRIPTION

For ease of understanding of the present application, the following describes the present application in more detail with reference to the accompanying drawings and specific, embodiments. It should be noted that when an element is "fixed to" another element, the element may be directly on the another element, or there may be one or more elements between the elements. When an element is "connected to" another element, the element may be directly connected to the another element, or there may be one or more elements between the elements. Terms such as "vertical", "horizontal", "left", "right", and similar expressions used in this specification are for illustration only.

Unless otherwise defined, all technical and scientific terms used in this specification shall have the same meanings as those commonly understood by a person skilled in the art to which the present application pertains. The terms used in this specification of the present application are only used to describe specific embodiments, and are not intended to limit the present application. The term "and/or" used in this specification includes any and all combinations of one or more relevant listed items.

In a related art, in order to output a current from an inner electrode assembly, a hole needs to be provided in an outer housing of the battery cell, then a feedthrough is provided in the foregoing opening, and the feedthrough is insulated from the battery cell housing. A part, inside the accommodating cavity in the battery cell housing, of the feedthrough is electrically connected to the electrode assembly, and a part, outside the battery cell housing, of the feedthrough is configured to be electrically connected to an external circuit. Therefore, the battery cell housing in the foregoing structure is less integral. In addition, there is an excessively large distance between a positive electrode connecting terminal and a negative electrode connecting terminal that are provided on the battery cell housing and that are electrically connected to the exterior, and therefore, it is difficult to electrically connect the external circuit to the battery cell.

In view of this, referring to FIG. 1 to FIG. 9, an embodiment provides a battery cell housing, where the battery cell housing defines an accommodating cavity for accommodating an electrode assembly 400, and the battery cell housing includes a first housing 200 and a second housing 100. The first housing 200 and the second housing 100 each define a part of the accommodating cavity.

The first housing 200 is configured to be electrically connected to a first tab 410 of the electrode assembly 400. The second housing 100 is fixed to the first housing 200 in an insulated manner to define the accommodating cavity. The second housing 100 is configured to be electrically connected to a second tab 420 of the electrode assembly 400 and the second tab 420 is different from the first tab 410 in polarity. In other words, in this embodiment, the first housing 200 and the second housing 100 are charged separately with different polarities. When the first housing 200 is positively charged, the second housing 100 is negatively charged; or when the first housing 200 is negatively charged, the second housing 100 is positively charged. Specific polarities of the first housing 200 and the second housing 100 may be determined based on an actual need. In the battery cell housing provided in the present application, the first housing 200 is electrically connected to the first tab 410 and the second housing 100 is electrically connected to the second tab 420. Therefore, to meet a need of an electric connection to the external circuit, there is no need to provide a hole in the battery cell housing, and a current in the battery cell housing can be directly output to the external circuit through the first housing 200 and the second housing 100, thereby rendering the battery cell housing more integral.

The applicant has found that when the first housing 200 and the second housing 100 are configured to output the current, due to a difference in structural designs of the battery cell housing, the first housing and the second housing may not necessarily be at optimal relative positions and when relative positions of the first housing and the second housing are farther, it is even more difficult to electrically connect both the first housing and the second housing to the external circuit. To solve the foregoing problem, further, in this embodiment, the first housing 200 includes a bulge 210 configured to be electrically connected to the first tab 410, at least part of the bulge 210 is exposed outside the accommodating cavity, and the bulge 210 is configured to extend in a direction approaching the second housing 100. In this embodiment, the first housing 200 includes a bulge 210, and the bulge 210 is configured to be electrically connected to an external circuit. The bulge 210 is configured to extend in a direction approaching the second housing 100, that is, the existence of the bulge 210 shortens the distance between the first housing 200 and the second housing 100, so that there is a proper distance between the bulge 210 and the second housing 100, thereby facilitating electrical connections between both two electrodes of the battery cell 10 and the external circuit.

Figure 5:
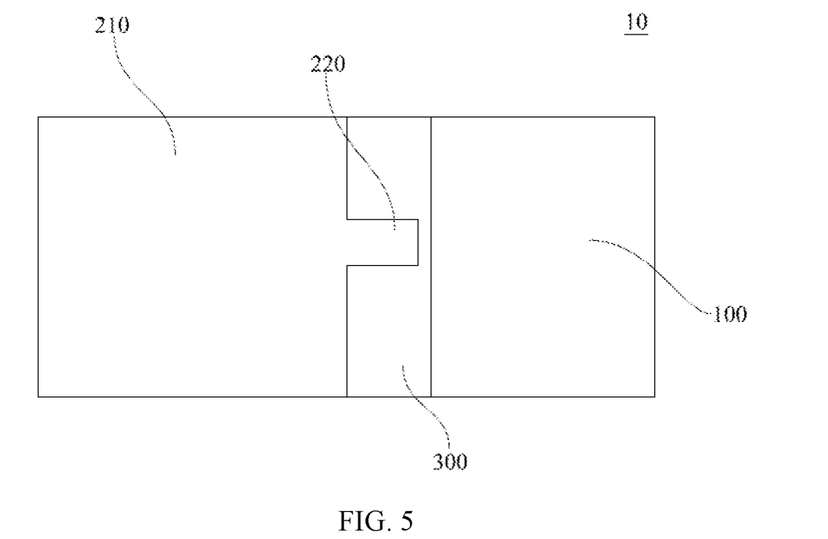
FIG. 5 is a schematic side view of a battery cell according to a second embodiment of the present application.
Figure 6:
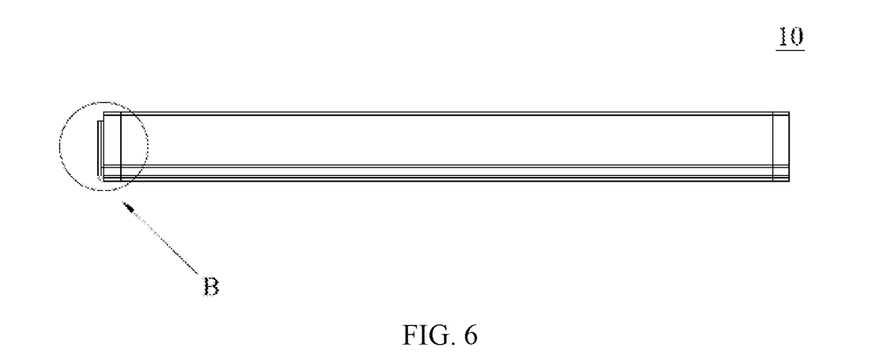
FIG. 6 is a schematic side view of a battery cell according to a third embodiment of the present application.
Figure 7:
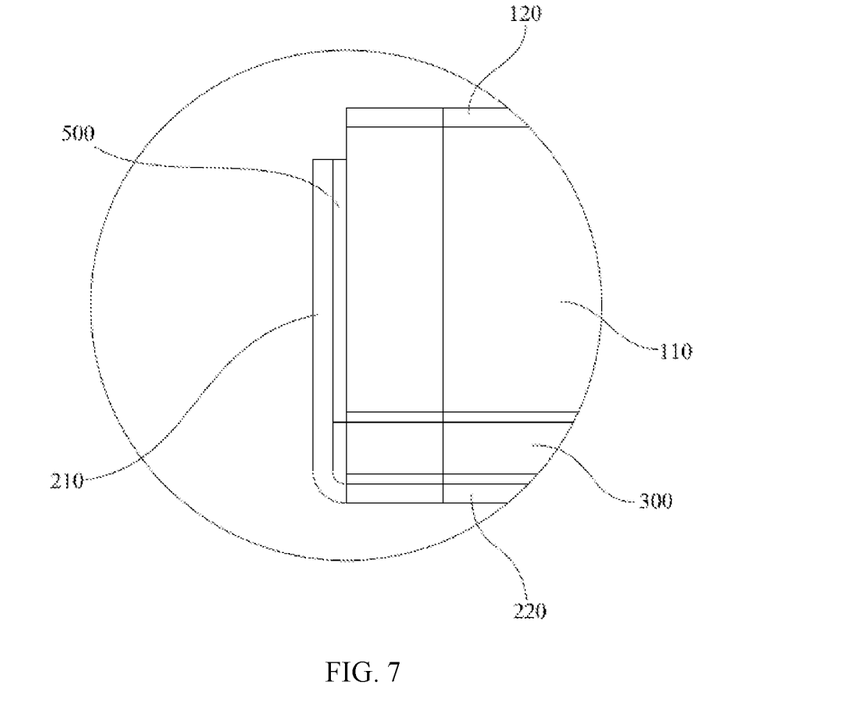
FIG. 7 is an enlarged partial schematic diagram of position B in FIG. 6.

A shape and a position of the bulge 210 may be determined based on an actual need. Referring to FIG. 5, in an embodiment, the bulge 210 may be configured to define the accommodating cavity of the battery cell housing, that is, one surface wall of the bulge 210 faces toward the accommodating cavity, and another opposite surface wall faces away from the accommodating cavity. The surface wall facing away from the accommodating cavity is configured to be electrically connected to an external circuit. When the bulge 210 is configured to define the accommodating cavity of the battery cell housing, the first tab 410 may be directly or indirectly electrically connected to the bulge 210. When the first tab 410 is directly electrically connected to the bulge 210, the first tab 410 is directly connected to the surface wall, facing the accommodating cavity, of the bulge 210. When the first tab 410 is indirectly electrically connected to the bulge 210, the first tab 410 is electrically connected to another part of the first housing 200 to implement the electrical connection between the first tab and the bulge 210.

In the foregoing embodiment, the bulge 210 is configured to define the accommodating cavity of the battery cell housing. Referring to FIG. 1 to FIG. 4, FIG. 6 and FIG. 7, in another embodiment, the bulge 210 may be outside the accommodating cavity, that is, no surface wall of the bulge 210 faces the accommodating cavity of the battery cell housing. When the bulge 210 is outside the accommodating cavity, the bulge 210 is positioned more flexibly, so that it is more convenient to adjust relative positions of the bulge and the second housing 100. Thus, the bulge can be electrically connected with the external circuit more conveniently.

To implement the electrical connection between the first housing 200 and the second housing 100, in an embodiment, the battery cell housing further includes a first insulation portion 300, and the first insulation portion 300 is connected to the first housing 200 and the second housing 100. The first housing 200, the second housing 100 and the first insulation portion 300 jointly define the accommodating cavity. In this solution, when the first insulation portion 300 is connected to the first housing 200 and the second housing 100 to implement the insulation between the first housing 200 and the second housing 100, a better insulation effect is obtained. In addition, the insulation portion is configured to define the accommodating cavity, and therefore, the insulation portion does not occupy an excessively large extra space.

Figure 1:
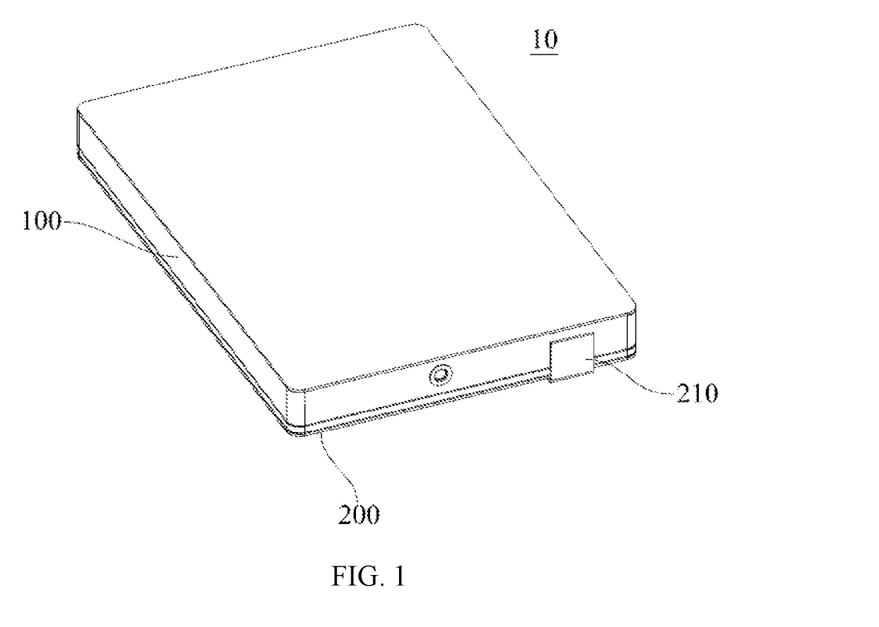
FIG. 1 is a schematic stereogram of a battery cell according to a first embodiment of the present application.
Figure 2:
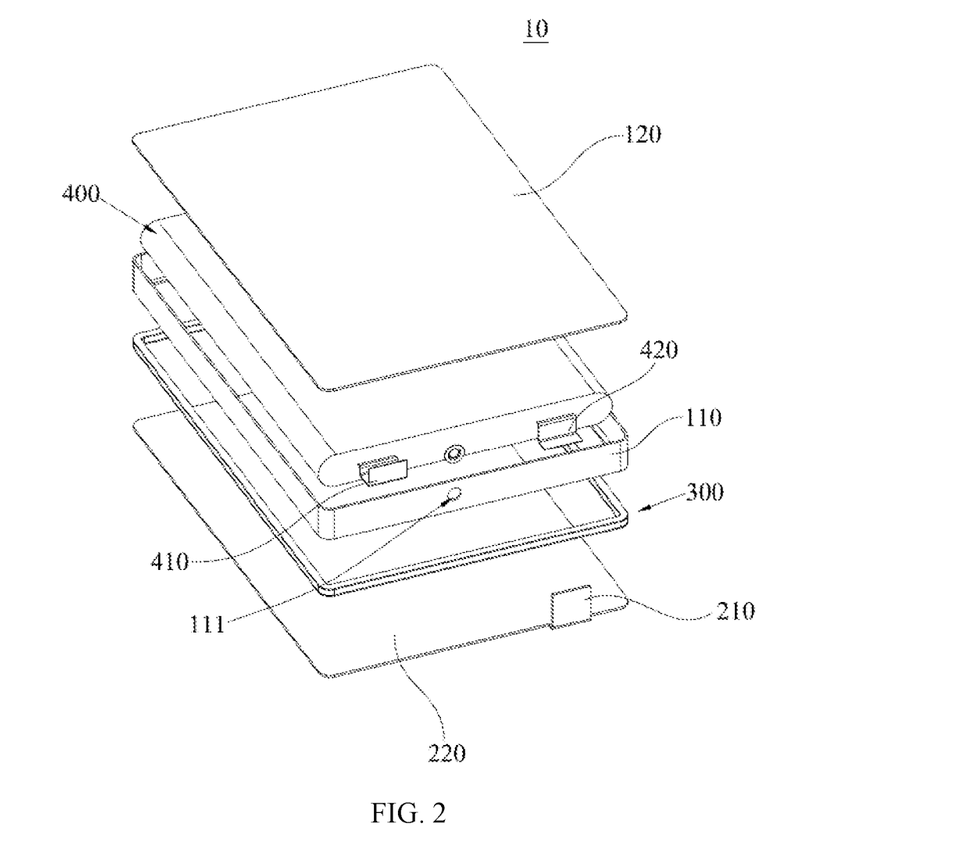
FIG. 2 is a schematic exploded view of a battery cell according to a first embodiment of the present application.

Specific structures of the first housing 200, the second housing 100 and the first insulation portion 300 may be determined based on a specific need. Referring to FIG. 1 and FIG. 2, in an embodiment, the second housing 100 includes an annular frame body 110 electrically connected to the first tab 410, and the frame body 110 includes a first port. The first insulation portion 300 is annular and is connected to an outer peripheral edge, at the first port, of the frame body 110. The first housing 200 further includes a first plate body 220; the first plate body 220 is connected to a side, farther away from the frame body 110, of the first insulation portion 300 and covers the first port; and the bulge 210 is connected to the first plate body 220. In this solution, the second housing 100 has the annular frame body 110, and one side of the second housing is connected to a plate-shaped bulge 210, so that the bulge 210 can extend in a circumferential direction, and the bulge 210 is positioned more flexibly. In particular, a connection manner of the bulge 210 and the first plate body 220 may be determined based on a specific need. For example, the bulge 210 may be welded or integrated with the first plate body 220.

In a further embodiment, the bulge 210 is outside the accommodating cavity and is connected to an edge of the first plate body 220. In this embodiment, the bulge 210 is connected to an edge of the first plate body 220, so that the bulge 210 can be closer to the second housing 100, thereby facilitating extension of the bulge 210 toward the second housing 100. In addition, in a specific embodiment, the bulge 210 can also be integrated with the first plate body 220, which can facilitate processing of the bulge 210. That is, the first plate body 220 and the bulge 210 can be processed at the same time through plate stamping at a lower cost.

In an embodiment, the bulge 210 is configured to extend in a direction approaching the frame body 110. In this solution, the frame body 110 is closer to the bulge 210, and the bulge 210 can extend toward the frame body 110 to shorten an extension distance of the bulge 210 and decrease a volume of the bulge 210. In another embodiment, the bulge 210 may also extend toward the other parts of the second housing 100 other than the frame body 110, so that the external circuit is electrically connected to both the bulge 210 and the other parts of the second housing 100 other than the frame body 110.

Figure 3:
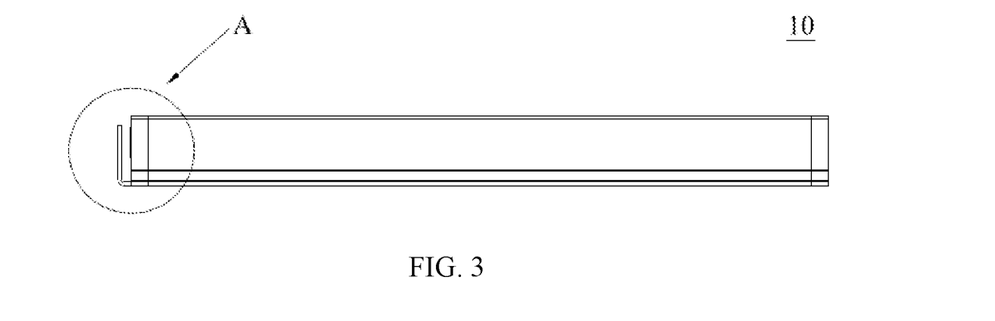
FIG. 3 is a schematic side view of a battery cell according to a first embodiment of the present application.
Figure 4:
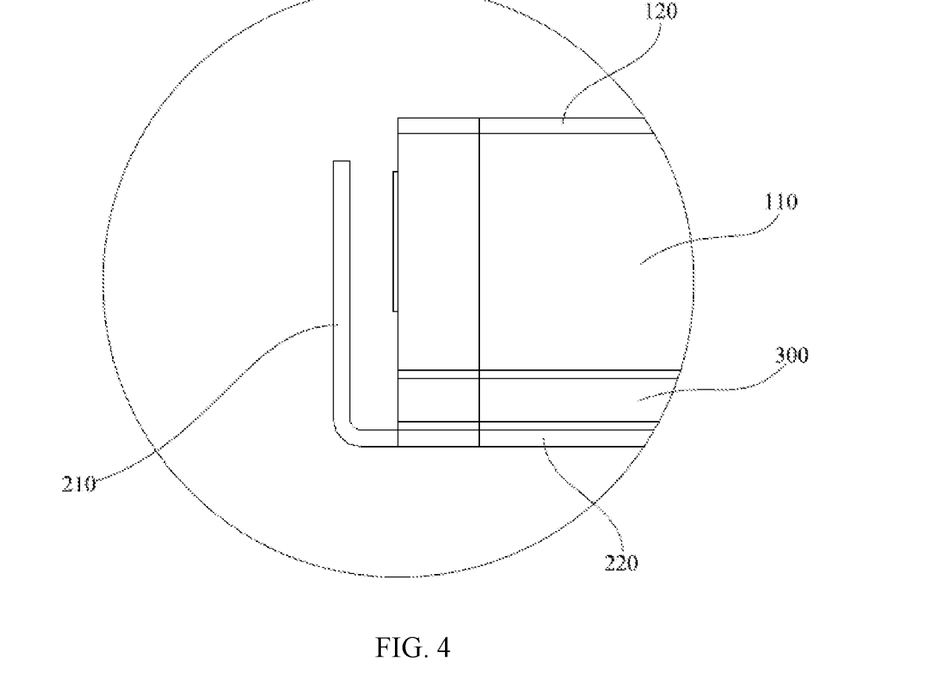
FIG. 4 is an enlarged partial schematic diagram of position A in FIG. 3.

When the bulge 210 extends in a direction approaching the frame body 110, the external circuit is electrically connected to both the bulge 210 and the frame body 110. Referring to FIG. 3 and FIG. 4, in an embodiment, the bulge 210 is spaced apart from an outer wall face of the frame body 110. In this solution, the bulge 210 is spaced apart from the frame body 110, to implement insulation between the bulge and the frame body through a simple structure at a low cost. Retelling to FIG. 6 and FIG. 7, in another embodiment, a second insulation portion is provided between the bulge 210 and the frame body 110, a side face of the second insulation portion is connected to the outer wall face of the frame body 110, and another side face of the second insulation portion is connected to the bulge 210. In this solution, the bulge 210 is fixed to the frame body 110 through the second insulation portion, so that the bulge 210 is arranged in a more stable structure.

Figure 8:
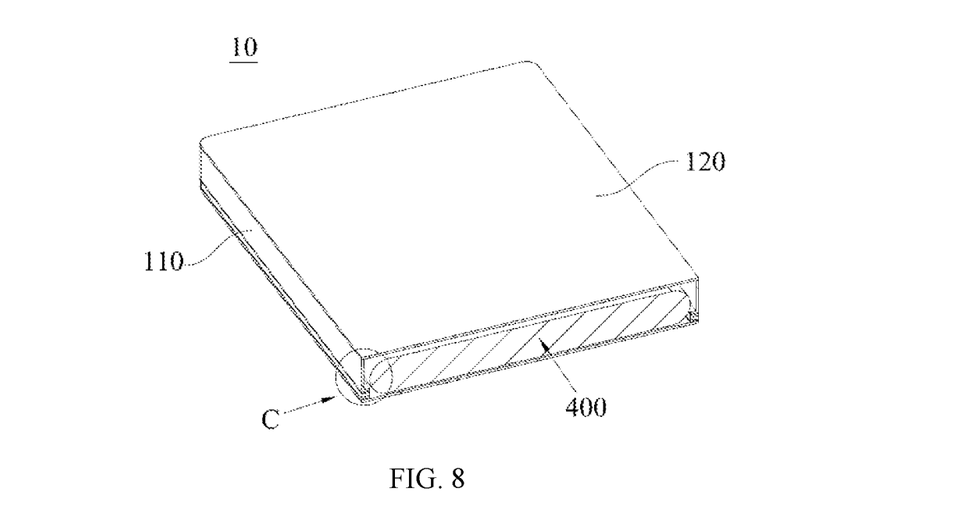
FIG. 8 is a schematic cross-sectional view of a battery cell according to a first embodiment of the present application.
Figure 9:
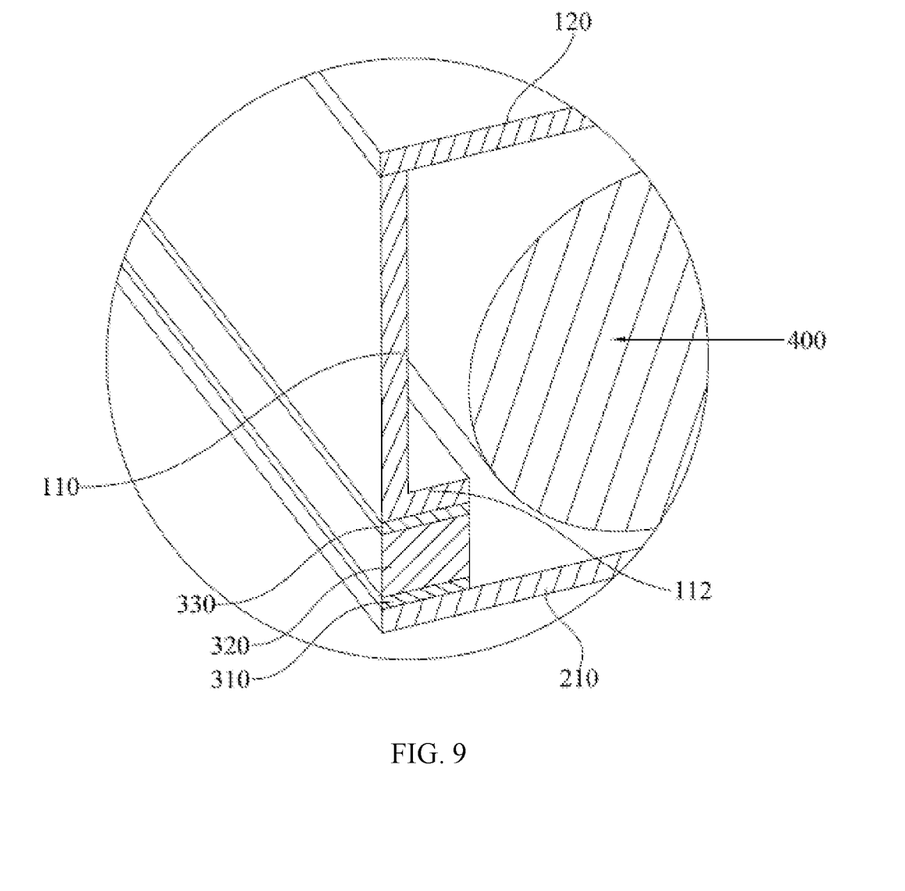
FIG. 9 is an enlarged partial schematic diagram of position C FIG. 8.

Referring to FIG. 8 and FIG. 9, in an embodiment, the first insulation portion 300 sequentially includes a first material layer 310, a second material layer 320 and a third material layer 330 in a direction from the first plate body 220 to the frame body 110. The second material layer 320 is made of an insulation material, specifically, a ceramic material. The first material layer 310 and the first plate body 220 each are made of a metal material. The metal material may specifically include at least one of Ni, Ti, Cu, Ag, Au, Pt, Fe, Co, Cr, W, Mo, Al, Mg, K, Na, Ca, Sr, Ba, Si, Ge, Sb, Pb, In, Zn, stainless steel and a composition (alloy) thereof. The third material layer 330 and the frame body 110 each are made of a metal material. The metal material may specifically include at least one of Ni, Ti, Cu, Ag, Au, Pt, Fe, Co, Cr, W, Mo, Al, Mg, K, Na, Ca, Sr, Ba, Ge, Sb, Pb, In, Zn, stainless steel and a composition (alloy) thereof. In this solution, since the first material layer 310 and the first plate body 220 each are made of a metal material, the first plate body 220 and the first material layer 310 are connected more reliably. Since the third material layer 330 and the frame body 110 each are made of a metal material, the third material layer 330 and the frame body 110 are connected more reliably.

To facilitate the connection between the frame body 110 and the first insulation portion 300, referring to FIG. 9, in an embodiment, a connecting flange 112 is provided at the outer peripheral edge, at the first port, of the frame body 110; the connecting flange 112 extends into the accommodating cavity; and the first insulation portion 300 is connected to a wall face, facing the first plate body 220, of the connecting flange 112. With a structure of the connecting flange 112, a connection area of the first insulation portion 300 and the frame body 110 is larger, and the first insulation portion and the frame body can be more stably connected.

In a further embodiment, the second housing 100 further includes a second plate body 120, the frame body 110 includes a second port opposite the first port, and the second plate body 120 is connected to the frame body 110 and covers the second port. In this solution, the first housing 200, the second housing 100 and the first insulation portion 300 may basically define the accommodating cavity, which requires fewer parts for the entire battery cell housing, thereby lowering costs for materials.

To improve structural strength of the battery cell housing and energy density of the battery cell 10 having the battery cell housing, in an embodiment, a maximum thickness of the frame body 110 is greater than that of the first plate body 220 and the second plate body 120, and the maximum thickness L1 of the frame body 110, the maximum thickness L2 of the first plate body 220 and the maximum thickness L3 of the second plate body 120 satisfy that $0.01 \text{ mm} \leq L1-L2 \leq 0.5$ mm, and $0.01 \text{ mm} \leq L1-L3 \leq 0.5$ mm. For example, L1−L2 may be specifically equal to 0.01 mm, 0.05 mm, 0.1 mm, 0.2 mm, 0.3 mm, 0.4 mm or 0.5 mm. L1−L3 may be specifically equal to 0.01 mm, 0.05 mm, 0.1 mm, 0.2 mm, 0.3 mm, 0.4 mm or 0.5 mm. In this solution, with a greater maximum thickness of the frame body 110, the structural strength of the housing of the battery cell 10 can be ensured, and with smaller maximum thicknesses of the first plate body 220 and the second plate body 120, the battery cell housing may occupy a smaller space and the electrode assembly 400 in the battery cell housing may have a larger volume, thereby further increasing the energy density of the battery cell 10 with the battery cell housing in the present application. That is, in the foregoing solution, the structural strength of the battery cell housing can be ensured, and the energy density of the battery cell 10 with the battery cell housing can also be improved.

Specifically, the maximum thickness L1 of the frame body 110 satisfies that $0.1 \text{ mm} \leq L1 \leq 1$ mm. For example, L1 may be specifically equal to 0.1 mm, 0.3 mm, 0.5 mm, 0.7 mm, 0.9 mm or 1 mm. The maximum thickness L2 of the first plate body 220 satisfies that $0.03 \text{ mm} \leq L2 \leq 0.6$ mm. For example, L2 may be specifically 0.03 mm, 0.08 mm, 0.15 mm, 0.3 mm, 0.45 mm or 0.6 mm. The maximum thickness L3 of the second plate body 120 satisfies that $0.03 \text{ mm} \leq L3 \leq 0.6$ mm. For example, L3 may be specifically 0.03 mm, 0.08 mm, 0.15 mm, 0.3 mm, 0.45 mm or 0.6 mm. In this solution, when the maximum thickness L1 of the frame body 110 is within the foregoing size range, the frame body 110 can have proper structural strength without occupying an excessively large space of the electrode assembly 400. When the maximum thickness L2 of the first plate body 220 is within the foregoing size range, the first plate body may occupy a smaller space while ensuring a basic protection effect. When the maximum thickness L3 of the second plate body 120 is within the foregoing size range, the second plate body may occupy a smaller space while ensuring a basic protection effect.

The frame body 110, the first plate body 220 and the second plate body 120 may be made of specific materials determined according to an actual need. Specifically, the frame body 110 may be made of a carbon material, a metal material or a polymer material. The first plate body 220 may be made of a carbon material, a metal material or a polymer material. The second plate body 120 is made of a carbon material, a metal material or a polymer material. In this solution, the frame body 110, the first plate body 220 and the second plate body 120 can facilitate wire connection, and can also have sufficient structural strength.

In the materials mentioned in the present application, the carbon material includes at least one of carbon felt, a carbon film, carbon black, acetylene black, fullerene, a conductive graphite film, or a graphene film. The polymer material includes at least one of polyethylene terephthalate, polybutylene terephthalate, polyethylene naphthalate, polyether ether ketone, polyimide, polyamide, polyethylene glycol, polyamide-imide, polycarbonate, cyclic polyolefin, polyphenylene sulfide, polyvinyl acetate, polytetrafluoroethylene, polymethylene naphthalene, polyvinylidene fluoride, polyethylene naphthalate, polypropylene carbonate, poly(vinylidene fluoride-hexafluoropropylene), poly(vinylidene fluoride-co-chlorotrifluoroethylene), silicone, vinylon, polypropylene, acid anhydride modified polypropylene, polyethylene, other ethylene and copolymer (EVA, EEA, EAA, and EVAL), polyvinyl chloride, polystyrene, other types of polyolefins, polyether nitrile, polyurethane, polyphenylene ether, polyester, polysulfone, amorphous α-olefin copolymer, or a derivative thereof. The metal material may include at least one of Ni, Ti, Cu, Ag, Au, Pt, Fe, Co, Cr, W, Mo, Al, Mg, K, Na, Ca, Sr, Ba, Si, Ge, Sb, Pb, In, Zn, stainless steel and a composition (alloy) thereof.

In a further embodiment, the frame body 110 is provided with a liquid injection hole 111. In this solution, the liquid injection hole 111 is provided in a relatively thicker frame body 110, which can facilitate opening and sealing of the liquid injection hole 111.

In a further embodiment, the first plate body 220 or the second plate body 120 is provided with an explosion-proof valve. In this solution, the explosion-proof valve is arranged on the relatively thinner first plate body 220 or second plate body 120, which can reduce processing difficulty of the explosion-proof valve and also improve protection performance of the explosion-proof valve.

A second aspect of the present application also provides a battery cell 10, where the battery cell 10 includes the battery cell housing and the electrode assembly 400 according to any one of the foregoing embodiments. The battery cell housing defines an accommodating cavity, and the electrode assembly 400 is provided in the accommodating cavity.

A third aspect of the present application further provides a battery, where the battery includes the battery cell 10 in the foregoing embodiments. Specifically, the battery may include one or more battery cells 10, and when the battery includes a plurality of battery cells 10, the battery cells 10 may be mutually connected in series or in parallel.

A fourth aspect of the present application further provides an electric device, where the electric device includes the battery in the foregoing embodiments. Specifically, the electric device may be a mobile device such as a mobile phone, a tablet computer, or a notebook computer. The electric device may also be a transportation tool such as an electric vehicle and an electric motorcycle.

It should be noted that, although this specification and the accompanying drawings of the present application provide preferable embodiments of the present application, the present application can be implemented in many different forms, and is not limited to some embodiments described in this specification. These embodiments should not be construed as additional limitations on the content of the present application, and these embodiments are provided for ease of a more thorough and comprehensive understanding of the disclosed content of the present application. In addition, the foregoing technical features are further mutually combined to form various embodiments not listed above, and some embodiments are all construed as falling within the scope recorded in this specification of the present application; and further, a person of ordinary skill in the art can make improvements or changes based on the foregoing descriptions, and all these improvements and changes shall fall within the protection scope of the appended claims of the present application.

What is claimed is:

1. A battery cell housing, defining an accommodating cavity for accommodating an electrode assembly, wherein the battery cell housing comprises:
   a first housing, wherein the first housing is configured to be electrically connected to a first tab of the electrode assembly; and
   a second housing, wherein the second housing is fixed to the first housing in an insulated manner to define the accommodating cavity, the second housing is configured to be electrically connected to a second tab of the electrode assembly, and the second tab is different from the first tab in polarity;
   wherein the first housing comprises a bulge configured to be electrically connected to the first tab, at least a part of the bulge is exposed outside the accommodating cavity, and the bulge is configured to extend in a direction approaching the second housing,
   wherein the battery cell housing further comprises a first insulation portion, and the first insulation portion is connected to the first housing and the second housing; and the first housing, the second housing and the first insulation portion together define the accommodating cavity,
   the second housing comprises a frame body electrically connected to the first tab, and the frame body comprises a first port, wherein the frame body is an annular frame body:
   the first insulation portion is annular and is connected to an outer peripheral edge at the first port of the frame body;
   the first housing further comprises a first plate body; the first plate body is connected to a side of the first insulation portion facing away from the frame body and covers the first port; and the bulge is connected to the first plate body;
   the first insulation portion sequentially comprises a first material layer, a second material layer, and a third material layer in a direction from the first plate body to the frame body; and the second material layer is made of an insulation material, the first material layer and the first plate body each are made of a metal material, and the third material layer and the frame body each are made of the metal material.

2. The battery cell housing according to claim 1, wherein the bulge is outside the accommodating cavity.

3. The battery cell housing according to claim 1 wherein the bulge is outside the accommodating cavity and is connected to an edge of the first plate body.

4. The battery cell housing according to claim 1, wherein the bulge is configured to extend in a direction approaching the frame body.

5. The battery cell housing according to claim 4, wherein the bulge is spaced apart from an outer wall face of the frame body.

6. The battery cell housing according to claim 5, wherein a second insulation portion is provided between the bulge and the frame body, a side face of the second insulation portion is connected to the outer wall face of the frame body, and another side face of the second insulation portion is connected to the bulge.

7. The battery cell housing according to claim 1, wherein
a connecting flange is provided at the outer peripheral edge, at the first port, of the frame body;
the connecting flange extends into the accommodating cavity; and the first insulation portion is connected to a wall face of the connecting flange facing the first plate body.

8. The battery cell housing according to claim 1, wherein the second housing further comprises a second plate body, the frame body comprises a second port opposite the first port, and the second plate body is connected to the frame body and covers the second port.

9. The battery cell housing according to claim 8, wherein a maximum thickness of the frame body is greater than a maximum thickness of the first plate body and the second plate body, and the maximum thickness $L1$ of the frame body, the maximum thickness $L2$ of the first plate body and the maximum thickness $L3$ of the second plate body satisfy that $0.01\ mm \leq L1-L2 \leq 0.5\ mm$, and $0.01\ mm \leq L1-L3 \leq 0.5\ mm$.

10. The battery cell housing according to claim 9, wherein
$0.1\ mm \leq L1 \leq 1\ mm$;
$0.03\ mm \leq L2 \leq 0.6\ mm$; and
$0.03\ mm \leq L3 \leq 0.6\ mm$.

11. The battery cell housing according to claim 10, wherein
the frame body is made of a carbon material, a metal material or a polymer material;
the first plate body is made of a carbon material, a metal material or a polymer material; and
the second plate body is made of a carbon material, a metal material or a polymer material.

12. The battery cell housing according to claim 9, wherein the frame body is provided with a liquid injection hole.

13. The battery cell housing according to claim 9, wherein the first plate body or the second plate body is provided with a valve.

14. A battery cell, comprising the battery cell housing according to claim 1, wherein
the electrode assembly is provided in the accommodating cavity, the electrode assembly comprises the first tab and the second tab, the first tab is electrically connected to a first housing, and the second tab is electrically connected to a second housing.

15. The battery cell according to claim 14, wherein the bulge is outside the accommodating cavity.

16. The battery cell according to claim 14, wherein the battery cell housing further comprises a first insulation portion, and the first insulation portion is connected to the first housing and the second housing; and
the first housing, the second housing and the first insulation portion together define the accommodating cavity.

17. The battery cell according to claim 14, wherein the bulge is outside the accommodating cavity and is connected to an edge of the first plate body.

18. A battery, comprising the battery cell according to claim 14.

19. An electric device, comprising the battery according to claim 18.

* * * * *